(12) United States Patent
Yu et al.

(10) Patent No.: US 11,628,718 B2
(45) Date of Patent: Apr. 18, 2023

(54) TRANSMISSION DEVICE OF HYBRID VEHICLE

(71) Applicant: HARBIN DONGAN AUTOMOTIVE ENGINE MANUFACTURING CO., LTD., Harbin (CN)

(72) Inventors: Zhonggui Yu, Harbin (CN); Zhaopeng Chai, Harbin (CN); Yongjun Feng, Harbin (CN); Xiaoyu Li, Harbin (CN); Xiaoxing Yuan, Harbin (CN); Jiqiu Bing, Harbin (CN); Xiaoning Liu, Harbin (CN); Mo Wang, Harbin (CN); Peng Zhang, Harbin (CN); Zhiqiang Yuan, Harbin (CN); Haitao Jia, Harbin (CN); Shi Feng, Harbin (CN); Wang Tan, Harbin (CN); Tao Yu, Harbin (CN); Shuai Zhen, Harbin (CN); Yue Wang, Harbin (CN)

(73) Assignee: HARBIN DONGAN AUTOMOTIVE ENGINE MANUFACTURING CO. LTD., Harbin (CN)

( * ) Notice: Subject to any disclaimer, the term of this patent is extended or adjusted under 35 U.S.C. 154(b) by 0 days.

(21) Appl. No.: 17/659,785

(22) Filed: Apr. 19, 2022

(65) Prior Publication Data
US 2023/0074162 A1 Mar. 9, 2023

(30) Foreign Application Priority Data
Sep. 3, 2021 (CN) .......................... 202111032608.9

(51) Int. Cl.
*B60K 6/54* (2007.10)
*B60K 6/547* (2007.10)
(Continued)

(52) U.S. Cl.
CPC .............. *B60K 6/547* (2013.01); *B60K 6/365* (2013.01); *B60K 6/44* (2013.01)

(58) Field of Classification Search
CPC ............. B60K 6/365; B60K 6/44; B60K 1/02
(Continued)

(56) References Cited

U.S. PATENT DOCUMENTS 7,214,154 B2 * 5/2007 Klemen ................ B60K 6/365
475/5
7,998,016 B2 * 8/2011 Si .......................... B60K 6/445
475/284
(Continued)

*Primary Examiner* — Derek D Knight
(74) *Attorney, Agent, or Firm* — M&B IP Analysts, LLC

(57) ABSTRACT

The present disclosure discloses a transmission device of a hybrid vehicle. The transmission device includes an input shaft assembly, a power generation motor input shaft assembly, a driving motor input shaft assembly, an output shaft assembly, a clutch, an accelerating planetary gear train, a decelerating planetary gear train, and a parking mechanism. The input shaft assembly is located at a front end of the transmission device. The power generation motor input shaft assembly is located between the accelerating planetary gear train and the driving motor input shaft assembly. The driving motor input shaft assembly is located between the power generation motor input shaft assembly and the decelerating planetary gear train. The output shaft assembly is located at a tail end of the transmission device. The clutch is located between a power generation motor and a driving motor.

13 Claims, 1 Drawing Sheet

(51) Int. Cl.
*B60K 6/365* (2007.10)
*B60K 6/44* (2007.10)

(58) Field of Classification Search
USPC .............................................................. 475/5
See application file for complete search history.

(56) References Cited

U.S. PATENT DOCUMENTS 8,491,431 B2 *  7/2013  Si ............................ F16H 3/724
                                                              475/284
9,963,029 B1 *  5/2018  Duan ........................ B60K 6/44

* cited by examiner

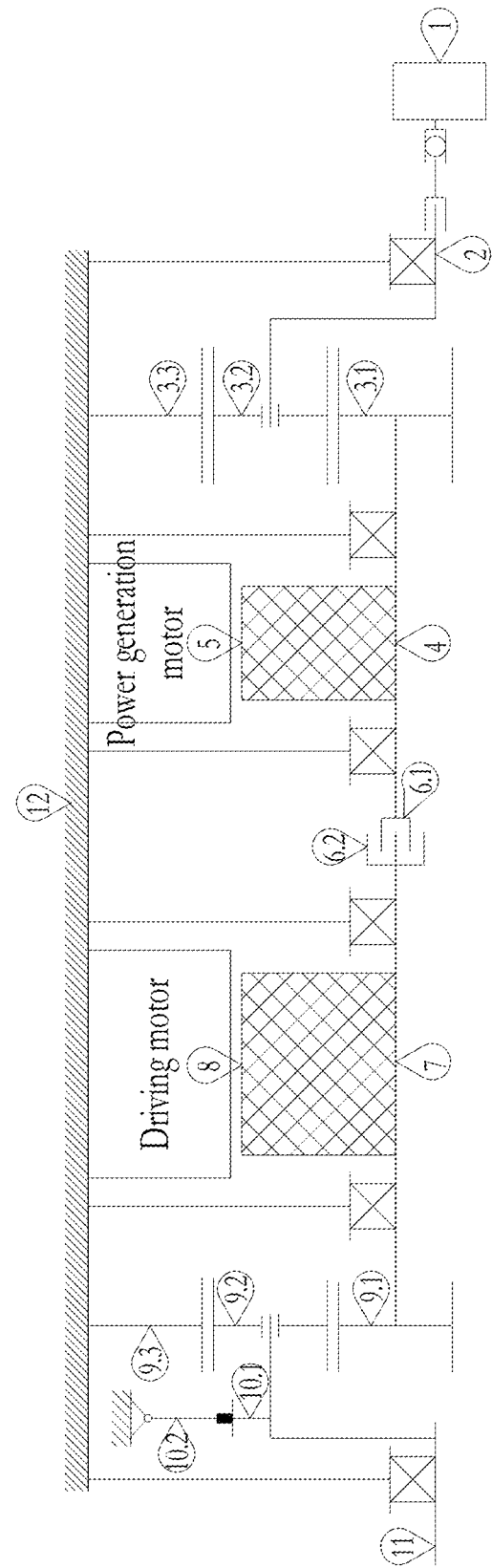

TRANSMISSION DEVICE OF HYBRID VEHICLE

CROSS REFERENCE TO RELATED APPLICATION

This patent application claims the benefit and priority of Chinese Patent Application No. 202111032608.9, filed on Sep. 03, 2021, the disclosure of which is incorporated by reference herein in its entirety as part of the present application.

TECHNICAL FIELD

The present disclosure relates to a power transmission device, specifically to a transmission device of a hybrid vehicle, which has an accelerating planetary gear train, a decelerating planetary gear train, and a clutch capable of achieving connection and disconnection of two motors.

BACKGROUND ART

As the global and China's domestic carbon peaking (2030) and carbon neutrality (2060) goals are put forward and the pressure on energy conservation and emission reduction increases, after the official implementation of the 2020 National-VI emission regulations for light vehicles, the Four-Stage Fuel Consumption Regulations for Light Commercial Vehicles is expected to be fully implemented in 2025. By 2035, annual sales of energy-saving vehicles and new energy vehicles will each account for half in China, and all traditional energy-powered passenger vehicles will be converted to hybrid vehicles, thus achieving the comprehensive electrification transformation of the automobile industry.

In recent years, with the rapid development and technological innovation of the automobile industry, new energy hybrid power plants have been more and more widespread applied to the field of transmissions, so that various power combination forms of an engine, a power generator, and a motor can be met, and the respective advantages of the engine and the motor can be fully exerted. Like a traditional fuel vehicle, the new energy hybrid power plants can meet the requirement for an endurance mileage and have low requirements for infrastructures. Like a full electric vehicle, the new energy hybrid power plants can meet the economic requirement. In the next few years, it is an important development direction of new energy vehicles.

Hybrid electric vehicles have the advantage of saving fuel. Hybrid electric vehicles do not have the range anxiety of pure electric vehicles and battery loss in extreme climates, and can meet the needs of users in all scenarios. Hybrid electric vehicles are very promising.

In recent years, in order to reduce the fuel consumption and respond to energy conservation and environmental protection, a multi-gear automatic transmission driven by an internal combustion engine serving as a single power source has been gradually developed, which tries to reduce the fuel consumption by increasing the number of gears. However, this method causes problems as follows: The first problem is that the structure of the transmission is becoming more and more complex, and the transmission is difficult to develop and manufacture and has high maintenance cost. The second problem is that the cost of a power transmission unit is increased, and the complex structure also brings higher development cost. The third problem is that increasing the number of gears does not usually achieve an obvious fuel consumption reducing effect. This will make the input and output not achieve an ideal balance.

SUMMARY

In order to overcome the shortcomings in the prior art, the present disclosure provides a compact-structured lightweight transmission device of a hybrid vehicle, which can achieve energy conservation and emission reduction and can also achieve 8 kinds of power transmission modes.

The objective of the present disclosure is achieved through the following technical solutions:

A transmission device of a hybrid vehicle includes an input shaft assembly, a power generation motor input shaft assembly, a driving motor input shaft assembly, an output shaft assembly, a clutch, an accelerating planetary gear train, a decelerating planetary gear train, and a parking mechanism;

the input shaft assembly is located at a front end of the transmission device; the power generation motor input shaft assembly is located between the accelerating planetary gear train and the driving motor input shaft assembly; the driving motor input shaft assembly is located between the power generation motor input shaft assembly and the decelerating planetary gear train; the output shaft assembly is located at a tail end of the transmission device; the clutch is located between a power generation motor and a driving motor;

the input shaft assembly is composed of an input shaft and an accelerating planetary gear train planetary frame; the input shaft is connected to a power source; the input shaft is provided with the accelerating planetary gear train planetary frame;

the power generation motor input shaft assembly is composed of a motor input shaft, an accelerating planetary gear train sun wheel and a clutch hub; the motor input shaft is provided with the accelerating planetary gear train sun wheel and the clutch hub;

the driving motor input shaft assembly is composed of a driving motor input shaft, a clutch retainer and a decelerating planetary gear train sun wheel; the driving motor input shaft is provided with the clutch retainer and the decelerating planetary gear train sun wheel;

the output shaft assembly is composed of an output shaft, a parking gear and a decelerating planetary gear train planetary frame; the output shaft is provided with the parking gear and the decelerating planetary gear train planetary frame;

the clutch is composed of the clutch hub and the clutch retainer; the clutch hub is connected to the motor input shaft; the clutch retainer is connected to the driving motor input shaft;

the accelerating planetary gear train is composed of an accelerating planetary gear train planet wheel, an accelerating planetary gear train outer tooth ring, an accelerating planetary gear train planetary frame and an accelerating planetary gear train sun wheel; the accelerating planetary gear train outer tooth ring is fixed on a housing; the accelerating planetary gear train planet wheel, is fixed on the accelerating planetary gear train planetary frame; the accelerating planetary gear train planetary wheel is internally meshed with the accelerating planetary gear train outer tooth ring; the accelerating planetary gear train planetary wheel is externally meshed with the accelerating planetary gear train planetary frame;

the decelerating planetary gear train is composed of a decelerating planetary gear train planet wheel, a decelerating planetary gear train outer tooth ring, a decelerating planetary gear train planetary frame and a decelerating planetary gear train sun wheel; the decelerating planetary gear train outer tooth ring is fixed on a housing; the decelerating planetary gear train planet wheel is fixed on the decelerating planetary gear train planetary frame; the decelerating planetary gear train planetary wheel is internally meshed with the decelerating planetary gear train outer tooth ring and externally meshed with the decelerating planetary gear train sun wheel;

the parking mechanism is composed of a parking gear and a parking pawl; the parking pawl is fixed on the housing; and the parking gear is integrated on the decelerating planetary gear train retainer.

Compared with the prior art, the present disclosure has the following advantages.

1. The present disclosure provides the transmission device of the hybrid vehicle, which has the accelerating planetary gear train, the decelerating planetary gear train, and the clutch capable of achieving connection and disconnection of two motors. The accelerating planetary gear train has a higher output rotating speed than an input rotating speed. On the contrary, the decelerating planetary gear train has a lower output rotating speed than an input rotating speed, thus achieving decelerating and torque increasing functions. The clutch can connect the driving motor with the power generation motor and disconnect the driving motor from the power generation motor under the control of a fuel pressure. A motor and engine combined driving output device can achieve fuel-electricity hybrid transmission power.

2. The transmission device of the hybrid vehicle of the present disclosure has a simple structure and reasonable design, is convenient to repair, and has low part cost and machining difficulty. Based on the simple planetary gear train structure and components of mature products in the market, an electric vehicle mode, two direct driving modes and two parallel connection modes are achieved through two motors and one clutch. The parallel mode can effectively improve the working condition of the engine. In combination with the direct driving mode of the engine, the fuel economy and dynamic property of a vehicle at a high speed can be effectively solved. The engine can be always in an efficient zone. The fuel consumption of the entire vehicle is excellent.

BRIEF DESCRIPTION OF THE DRAWINGS

FIG. 1 is a schematic structural diagram of a transmission device of a hybrid vehicle.

DETAILED DESCRIPTION OF THE EMBODIMENTS

The technical solutions of the present invention will be further described below in conjunction with the accompanying drawings, but are not limited thereto. Any modification or equivalent replacement of the technical solutions of the present disclosure without departing from the spirit and scope of the technical solutions of the present disclosure shall fall within the protection scope of the present disclosure.

The present disclosure provides a transmission device suitable for being applied to a front-engine rear-drive vehicle. As shown in FIG. 1, the transmission device includes an input shaft assembly, a power generation motor input shaft assembly, a driving motor input shaft assembly, an output shaft assembly, a clutch, an accelerating planetary gear train, a decelerating planetary gear train, and a parking mechanism. The input shaft assembly is located at a front end of the transmission device. The power generation motor input shaft assembly is located between the accelerating planetary gear train and the driving motor input shaft assembly. The driving motor input shaft assembly is located between the power generation motor input shaft assembly and the decelerating planetary gear train. The output shaft assembly is located at a tail end of the transmission device. The clutch is located between a power generation motor and a driving motor.

In the present disclosure, the input shaft assembly is composed of an input shaft 2 and an accelerating planetary gear train planetary frame 3.2. The input shaft 2 is connected to a power source. The input shaft 2 is provided with the accelerating planetary gear train planetary frame 3.2. The input shaft assembly can input a transmission input to the accelerating planetary gear train.

In the present disclosure, the power generation motor input shaft assembly is composed of a motor input shaft 4, an accelerating planetary gear train sun wheel 3.1 and a clutch hub 6.1. The motor input shaft 4 is provided with the accelerating planetary gear train sun wheel 3.1 and the clutch hub 6.1. The power generation motor input shaft assembly can input an accelerating planetary gear train input to the clutch or to the power generation motor.

In the present disclosure, the driving motor input shaft assembly is composed of a driving motor input shaft 7, a clutch retainer 6.2 and a decelerating planetary gear train sun wheel 9.1. The driving motor input shaft 7 is provided with the clutch retainer 6.2 and the decelerating planetary gear train sun wheel 9.1. The driving motor input shaft assembly can input a clutch input to the decelerating planetary gear train or input a driving motor input to the decelerating planetary gear train.

In the present disclosure, the output shaft assembly is composed of an output shaft 11, a parking gear 10.1 and a decelerating planetary gear train planetary frame 9.2. A center line of the output shaft 11 is consistent with an axial direction of the input shaft 2. The output shaft 11 is provided with the parking gear 10.1 and the decelerating planetary gear train planetary frame 9.2. The output shaft assembly can input a decelerating planetary gear train input to the output shaft and finally output it to the vehicle.

In the present disclosure, the clutch is composed of the clutch hub 6.1 and the clutch retainer 6.2. The clutch hub 6.1 is connected to the power generation motor input shaft 4. The clutch retainer 6.2 is connected to the driving motor input shaft. Under different working condition modes, the clutch achieves disconnection and connection according to a fuel pressure and can disconnect the power generation motor input shaft 5 from the driving motor input shaft 7 and connect the power generation motor input shaft 5 to the driving motor input shaft 7. When power from the input shaft is transmitted to the clutch hub 6.2, a power flow will be divided according to an actual working condition. One part can be input to the power generation motor to make the motor to generate power to charge a storage battery, and the other part. If the clutch is engaged at this time, the power flow from the input shaft will be transmitted by the clutch to the output shaft at the tail end of the transmission device. If the clutch is disengaged at this time, the power flow from the input shaft will be interrupted at the clutch.

In the present disclosure, the accelerating planetary gear train is composed of an accelerating planetary gear train planetary wheel, an accelerating planetary gear train outer tooth ring 3.3, an accelerating planetary gear train planetary frame 3.2, and an accelerating planetary gear train sun wheel 3.1 and can accelerate the transmission input. The accelerating planetary gear train outer tooth ring 3.3 is fixed on the housing, with its rotating speed fixed. The accelerating planetary gear train planetary wheel is fixed on the accelerating planetary gear train planetary frame 3.2. The accelerating planetary gear train planetary wheel can be supported by the accelerating planetary gear train planetary frame 3.2 in a rotatable manner. The accelerating planetary gear train planetary wheel is internally engaged with the accelerating planetary gear train outer tooth ring 3.3 and externally engaged with the accelerating planetary gear train sun wheel 3.1. The accelerating planetary gear train planetary frame 3.2 has the same rotating speed as that of the input shaft 2. After being accelerated by the accelerating planetary gear train, the rotating speed is transmitted to the accelerating planetary gear train sun wheel 3.1. At this time, since the accelerating planetary gear train is composed of a single -planetary gear train, an efficient power output interval of the engine can be easily optimized as long as a proper speed increasing ratio is determined. Particularly, the engine can continuously output power under a working condition of the highest fuel economy.

In the present disclosure, the decelerating planetary gear train is composed of a decelerating planetary gear train planetary wheel, a decelerating planetary gear train outer tooth ring 9.3, a decelerating planetary gear train planetary frame 9.2, and a decelerating planetary gear train sun wheel 9.1 and can accelerate the transmission input. The decelerating planetary gear train outer tooth ring 9.3 is fixed on the housing, with its rotating speed fixed. The decelerating planetary gear train planetary wheel is fixed on the decelerating planetary gear train planetary frame 9.2. The decelerating planetary gear train planetary wheel can be supported by the decelerating planetary gear train planetary frame 9.2 in a rotatable manner. The planetary wheel is internally engaged with the decelerating planetary gear train outer tooth ring 9.3 and externally engaged with the decelerating planetary gear train sun wheel 9.1. The decelerating planetary gear train sun wheel 9.1 has the same rotating speed as that of the driving motor input shaft 7. After being decelerated by the decelerating planetary gear train, the rotating speed of the decelerating planetary gear train sun wheel 9.1 is transmitted to the decelerating planetary gear train planetary frame 9.2. At this time, the decelerating planetary gear train is composed of a single planetary gear train just like the accelerating planetary gear train, so that an extremely large torque output can be obtained by means of deceleration and torque increasing, which is very beneficial for climbing and acceleration, In the present disclosure, the parking mechanism is composed of the parking gear 10.1 and the parking pawl 10.2 and can stop the vehicle. The parking pawl 10.2 is fixed on the housing. The parking gear 10.1 is integrated on the decelerating planetary gear train planetary frame 9.2. When the parking gear 10.1 and the parking pawl 10.2 are combined, the hybrid device transmission component stops rotating, and the vehicle is stopped at this time.

In the present disclosure, the rotation of the input shaft assembly is supported by a bearing; the input shaft 2 of the input shaft assembly is rigidly connected to the accelerating planetary gear train planetary frame 3.2. At this time, when the power is transmitted from the power source to the input shaft 2, the input shaft assembly can input the transmission input to the accelerating planetary gear train.

In the present disclosure, the connection methods include, but are not limited to, welding, riveting, spline fit, interference fit, hinged connection, integrated machining, and the like.

In the present disclosure, the rotation of the power generation motor input shaft assembly is supported by a bearing. The motor input shaft 4 of the power generation motor input shaft assembly is connected to the accelerating planetary gear train sun wheel 3.1 and the clutch hub 6.1. At the same time, the power generation motor input shaft assembly is detachably connected to the power generation motor 5. In the present disclosure, the power generation motor input shaft assembly is detachably connected to the power generation motor 5. At this time, since the power generation motor input shaft is detachably connected to the power generation motor, when the power generation motor input shaft and the power generation motor fail, faulted parts are easily repaired, which reduces the maintenance cost.

In the present disclosure, the rotation of the driving motor input shaft assembly is supported by a bearing. The driving motor input shaft 7 of the driving motor input shaft assembly is rigidly connected to the clutch retainer 6.2 and the decelerating planetary gear train sun wheel 9.1 At the same time, the driving motor input shaft assembly is detachably connected to the driving motor 8. At this time, like the detachable connection between the power generation motor input shaft and the power generation motor, when the driving motor input shaft or the driving motor fails, only the faulted part is easily repaired, which reduces the maintenance cost.

In the present disclosure, the rotation of the output shaft assembly is supported by a bearing. The output shaft 11 of the output shaft assembly is rigidly connected to the decelerating planetary gear train planetary frame 9.2, and the parking gear 10.1 is integrated on the decelerating planetary gear train planetary frame 9.2.

In the present disclosure, since the axial size is much greater than the radial size, the hybrid transmission device can be well applicable to a vehicle, the output shaft (crankshaft) of the engine of which is longitudinally configured relative to a forward direction of the vehicle.

In the present disclosure, the clutch is located between the power generation motor and the driving motor, so that the clutch can easily make the two motors connected and disconnected. At the same time, the two motors are separately disposed, which can also reduce the thermal field interference between the motors and is more favorable for heat dissipation. The tooth shape of the parking gear is simple and is easy to machine, so that the parking gear can be integrated on the decelerating planetary gear train planetary frame 9.2. Along the radial direction, the parking gear and the decelerating planetary gear train retainer overlap in the axial direction. Thus, the parking gear and the decelerating planetary gear train retainer can be compactly disposed without being staggered, and the entire structure of the transmission device is compact.

In the present disclosure, there are three cases for the power input of the output shaft 11: A: all the power comes from the engine 1; B: all the power comes from the driving motor 8; C: the power comes from both the engine 1 and the driving motor 8. At this time, when the vehicle is in moving, reversing, climbing, and other conditions, driver's needs can be easily met by selecting different power sources.

The transmission device of the present disclosure can achieve the following 8 transmission modes in different working states of the clutch, the engine, the driving motor, and the power generation motor:

Mode 1—electric vehicle (EV): in this mode, as shown in Table 1, the engine 1 and the power generator 5 do not work; the clutch is disengaged; and the driving motor 8 independently outputs power that serves as a power source of the transmission device. A power transmission line: the driving motor 8 implements driving and implements transmission with the driving motor input shaft assembly to transmit the power to the decelerating planetary gear train sun wheel 9.1. Under the fixed decelerating planetary gear train outer tooth ring 9.3, the rotating speed transmitted from the decelerating planetary gear train sun wheel 9.1 to the decelerating planetary gear train planetary frame 9.2 is decelerated and output (relative to the decelerating planetary gear train sun wheel), so that the power is finally transmitted to the output shaft 11.

Mode 2—serial connection: in this mode, as shown in Table 1, the engine 1 transmits the power to the power generation motor 5. The power generation motor 5 converts the power of the engine into electric energy that is stored in a battery. The clutch is disengaged, and the driving motor 8 generates power. A power transmission line: the power from the engine is transmitted to the accelerating planetary gear train planetary frame 3.2 through the input shaft 2. Under the action of the fixed accelerating planetary gear train outer tooth ring 3.3, the rotation from the accelerating planetary gear train planetary frame 3.2 is accelerated by the accelerating planetary gear train sun wheel 3.1 (relative to the rotating speed input by the engine). At the same time, the power is output to the power generation motor input shaft assembly. The power generation motor input shaft 4 and the power generation motor 5 rotate together. At this time, the power generation motor 5 converts the power into electric energy that is stored in the battery. Since the clutch is disengaged in this mode, the power from the engine ends at the clutch hub 6.1. At the same time, in this mode, the driving motor 8 implements driving and implements transmission with the driving motor input shaft assembly to transmit the power to the decelerating planetary gear train sun wheel 9.1. Under the fixed decelerating planetary gear train outer tooth ring 9.3, the rotating speed transmitted from the decelerating planetary gear train sun wheel 9.1 to the decelerating planetary gear train planetary frame 9.2 is decelerated and output (relative to the decelerating planetary gear train sun wheel), so that the power is finally transmitted to the output shaft 11.

Mode 3—direct driving 1: in this mode, as shown in Table 1, the engine 1 works; the power generation motor 5 and the driving motor 8 do not work; and the clutch is engaged. Under this working condition, the battery has sufficient electricity, so it is not necessary to charge the battery by the power generation motor 5. A power transmission line: the power from the engine is transmitted to the accelerating planetary gear train planetary frame 3.2 through the input shaft 2. Under the action of the fixed accelerating planetary gear train outer tooth ring 3.3, the rotation input of the accelerating planetary gear train planetary frame 3.2 is accelerated by the accelerating planetary gear train sun wheel 3.1 (relative to the rotating speed input by the engine). At the same time, the clutch is engaged. The clutch connects the power generation motor input shaft assembly to the driving motor input shaft assembly. The power from the power generation motor input shaft assembly is transmitted to the decelerating planetary gear train sun wheel 9.1 in the driving motor input shaft assembly through the engaged clutch. Under the action of the fixed decelerating planetary gear train outer tooth ring 9.3, the rotating speed transmitted from the decelerating planetary gear train sun wheel 9.1 to the decelerating planetary gear train planetary frame 9.2 is decelerated and output (relative to the decelerating planetary gear train sun wheel). The power is finally transmitted to the output shaft 11.

Mode 4—direct driving 2: in this mode, as shown in Table 1, the engine 1 works; the power generation motor 5 generates power; the driving motor 8 does not work; and the clutch is engaged. Under this working condition, the battery has insufficient electricity, so the power generation motor 5 needs to charge the battery. A power transmission line: the power from the engine is transmitted to the accelerating planetary gear train planetary frame 3.2 through the input shaft 2. Under the action of the fixed accelerating planetary gear train outer tooth ring 3.3, the rotation input of the accelerating planetary gear train planetary frame 3.2 is accelerated by the accelerating planetary gear train sun wheel 3.1 (relative to the rotating speed input by the engine). At the same time, the power is output to the power generation motor input shaft assembly. In addition, since the power generation motor works, the power on the power generation motor input shaft assembly is partially transmitted to the power generation motor 5. At this time, the power generation motor 5 charges the battery. The other part of power from the input shaft is transmitted to the decelerating planetary gear train sun wheel 9.1 in the driving motor input shaft assembly through the engaged clutch. Under the action of the fixed decelerating planetary gear train outer tooth ring 9.3, the rotating speed transmitted from the decelerating planetary gear train sun wheel 9.1 to the decelerating planetary gear train planetary frame 9.2 is decelerated and output (relative to the decelerating planetary gear train sun wheel). The power is finally transmitted to the output shaft 11

Mode 5—parallel connection 1: in this mode, as shown in Table 1, the engine 1 works; the power generation motor 5 does not work; the driving motor 8 works; and the clutch is engaged. Under this working condition, the battery has sufficient electricity, so it is not necessary to charge the battery by the power generation motor 5. A power transmission line: the power from the engine is transmitted to the accelerating planetary gear train planetary frame 3.2 through the input shaft 2. Under the action of the fixed accelerating planetary gear train outer tooth ring 3.3, the rotation input of the accelerating planetary gear train planetary frame 3.2 is accelerated by the accelerating planetary gear train sun wheel 3.1 (relative to the rotating speed input by the engine). At the same time, the power is output to the power generation motor input shaft assembly. At this time, the clutch is engaged. The clutch connects the power generation motor input shaft assembly to the driving motor input shaft assembly. The power from the power generation motor input shaft assembly is transmitted to the decelerating planetary gear train sun wheel 9.1 in the driving motor input shaft assembly through the engaged clutch. At the same time, the driving motor 8 works to also transmit the power to the decelerating planetary gear train sun wheel 9.1 through the driving motor input shaft 7. After the two parts of power are coupled by the decelerating planetary gear train sun wheel 9.1, under the action of the fixed decelerating planetary gear train outer tooth ring 9.3, the rotating speed transmitted from the decelerating planetary gear train sun wheel 9.1 to the decelerating planetary gear train planetary frame 9.2 is decelerated and output (relative to the decelerating planetary gear train sun wheel). The power is finally transmitted to the output shaft 11.

Mode 6—parallel connection 2: in this mode, as shown in Table 1, the engine 1 works; the power generation motor 5 and the driving motor 8 work; and the clutch is engaged. Under this working condition, the battery has insufficient electricity, so the power generation motor 5 needs to charge the battery. A power transmission line: the power from the engine is transmitted to the accelerating planetary gear train planetary frame 3.2 through the input shaft 2. Under the action of the fixed accelerating planetary gear train outer tooth ring 3.3, the rotation input of the accelerating planetary gear train planetary frame 3.2 is accelerated by the accelerating planetary gear train sun wheel 3.1 (relative to the rotating speed input by the engine). At the same time, the power is output to the power generation motor input shaft assembly. In addition, since the power generation motor works, the power on the power generation motor input shaft assembly is partially transmitted to the power generation motor 5. At this time, the power generation motor 5 charges the battery. The other part of power from the input shaft is transmitted to the decelerating planetary gear train sun wheel 9.1 in the driving motor input shaft assembly through the engaged clutch. At the same time, the driving motor 8 works to also transmit the power to the decelerating planetary gear train sun wheel 9.1 through the driving motor input shaft 7. After the two parts of power are coupled by the decelerating planetary gear train sun wheel 9.1, under the action of the fixed decelerating planetary gear train outer tooth ring 9.3, the rotating speed transmitted from the decelerating planetary gear train sun wheel 9.1 to the decelerating planetary gear train planetary frame 9.2 is subjected to deceleration and torque increasing and i output (relative to the decelerating planetary gear train sun wheel). The power is finally transmitted to the output shaft 11.

Mode 7—braking recovery: in this mode, as shown in Table 1, the engine 1 and the power generation motor 5 do not work. The driving motor 8 uses power generated by deceleration braking of the vehicle to charge the battery, and the clutch is disengaged. A power transmission line: the output shaft 11 receives the power generated by vehicle braking and transmits the power to the decelerating planetary gear train planetary frame 9.2. Under the action of the fixed decelerating planetary gear train outer tooth ring 9.3, the rotating speed transmitted from the decelerating planetary gear train planetary frame 9.2 to the decelerating planetary gear train sun wheel 9.1 is accelerated (relative to the decelerating planetary gear train planetary frame) to the driving motor input shaft assembly. Meanwhile, the power is transmitted to the driving motor 8. The driving motor 8 converts this part of power into electric energy that is stored in the battery.

Mode 8—idle power generation: in this mode, as shown in Table 1, the engine 1 and the power generation motor 5 work; the clutch is disengaged; and the driving motor 8 does not work. A power transmission line: the power from the engine is transmitted to the accelerating planetary gear train planetary frame 3.2 through the input shaft 2. Under the action of the fixed accelerating planetary gear train outer tooth ring 3.3, the rotation from the accelerating planetary gear train planetary frame 3.2 is accelerated by the accelerating planetary gear train sun wheel 3.1 (relative to the rotating speed input by the engine). At the same time, the power is output to the power generation motor input shaft assembly. The power generation motor input shaft 4 and the power generation motor 5 rotate together. At this time, the power generation motor 5 works to convert the power into electric energy that is stored in the battery. Since the clutch is disengaged in this mode, the power from the engine ends at the clutch hub 6.1.

TABLE 1

Working mode table of the transmission device

| Working mode | Engine | Power generation motor | Clutch | Driving motor |
|---|---|---|---|---|
| Mode 1-EV | Not working | Not working | Disengaged | Driving |
| Mode 2-serial connection | Working | Generating power | Disengaged | Driving |
| Mode 3-direct driving 1 | Working | Not working | Engaged | Not working |
| Mode 4-direct driving 2 | Working | Generating power | Engaged | Not working |
| Mode 5-parallel connection 1 | Working | Not working | Engaged | Driving |
| Mode 6-parallel connection 2 | Working | Generating power | Engaged | Driving |
| Mode 7-braking recovery | Not working | Not working | Disengaged | Generating power |
| Mode 8-idle power generation | Working | Generating power | Disengaged | Not working |

Reverse mode: the transmission device of the present disclosure is not provided with a mechanical reverse gear. The reverse function of the vehicle can be achieved by controlling, according to operation characteristics of the motor, the motor to clockwise or anticlockwise rotate under Mode 1—EV.

The kinematics and dynamics which are required to be used in the hybrid transmission device of the present disclosure and energy-efficiency-related rotating speed and torque relations that ignore system transfer can be expressed as the following relations:

$$n_S + \lambda_{nR} - (1+\lambda)n_C = 0 \tag{1}$$

$$T_S + T_C + T_R = 0 \tag{2}$$

$$T_S : T_C : T_R = 1 : (1+\lambda) : \lambda \tag{3}$$

$$\lambda = Z_R / Z_S \tag{4}$$

where the formulas (1), (2), (3), and (4) are applicable to the accelerating planetary gear train and the decelerating planetary gear train. The formula (1) is referred to as a planetary gear train rotating speed characteristic equation, and the formula (4) is referred to as a planetary gear train characteristic parameter. In the formulas, $Z_R$ and $Z_S$ respectively refer to the number of teeth of the outer tooth ring and the number of teeth of the sun wheel; ns refers to the rotating speed of the sun wheel; $n_C$ refers to the rotating speed of the planetary frame; $n_R$ refers to the rotating speed of the outer tooth ring; $T_S$ refers to the torque of the sun wheel; $T_C$ refers to the torque of the planetary frame; and $T_R$ refers to the torque of the outer tooth ring.

What is claimed is:

1. A transmission device of a hybrid vehicle, comprising an input shaft assembly, a power generation motor input shaft assembly, a driving motor input shaft assembly, an output shaft assembly, a clutch, an accelerating planetary gear train, a decelerating planetary gear train, and a parking mechanism, wherein the input shaft assembly is located at a front end of the transmission device; the power generation motor input shaft assembly is located between the accelerating planetary gear train and the driving motor input shaft assembly; the driving motor input shaft assembly is located between the power generation motor input shaft assembly and the decelerating planetary gear train; the output shaft assembly is located at a tail end of the transmission device; the clutch is located between a power generation motor and a driving motor;

the input shaft assembly is composed of an input shaft and an accelerating planetary gear train planetary frame; the input shaft is connected to a power source; the input shaft is provided with the accelerating planetary gear train planetary frame;

the power generation motor input shaft assembly is composed of a motor input shaft, an accelerating planetary gear train sun wheel and a clutch hub; the motor input shaft of the power generation motor input shaft assembly is provided with the accelerating planetary gear train sun wheel and the clutch hub;

the driving motor input shaft assembly is composed of a driving motor input shaft, a clutch retainer and a decelerating planetary gear train sun wheel; the driving motor input shaft of the driving motor input shaft assembly is provided with the clutch retainer and the decelerating planetary gear train sun wheel;

the output shaft assembly is composed of an output shaft, a parking gear and a decelerating planetary gear train planetary frame; the output shaft is provided with the parking gear and the decelerating planetary gear train planetary frame;

the clutch is composed of the clutch hub and the clutch retainer; the clutch hub is rigidly connected to the motor input shaft of the power generation motor input shaft assembly; the clutch retainer is connected to the driving motor input shaft of the driving motor input shaft assembly;

the accelerating planetary gear train is composed of an accelerating planetary gear train planet wheel, an accelerating planetary gear train outer tooth ring, the accelerating planetary gear train planetary frame and the accelerating planetary gear train sun wheel; the accelerating planetary gear train outer tooth ring is fixed on a housing; the accelerating planetary gear train planet wheel, is supported by the accelerating planetary gear train planetary frame rotatably; the accelerating planetary gear train planetary wheel is internally meshed with the accelerating planetary gear train outer tooth ring; the accelerating planetary gear train planetary wheel is externally meshed with the accelerating planetary gear train sun wheel;

the decelerating planetary gear train is composed of a decelerating planetary gear train planet wheel, a decelerating planetary gear train outer tooth ring, the decelerating planetary gear train planetary frame and the decelerating planetary gear train sun wheel; the decelerating planetary gear train outer tooth ring is fixed on a housing; the decelerating planetary gear train planet wheel is supported by the decelerating planetary gear train planetary frame rotatably; the decelerating planetary gear train planetary wheel is internally meshed with the decelerating planetary gear train outer tooth ring and externally meshed with the decelerating planetary gear train sun wheel;

the parking mechanism is composed of the parking gear and a parking pawl; the parking pawl is fixed on the housing; and the parking gear is integrated on the decelerating planetary gear train planetary frame.

2. The transmission device of the hybrid vehicle according to claim 1, wherein the input shaft is connected to the accelerating planetary gear train planetary frame.

3. The transmission device of the hybrid vehicle according to claim 1, wherein the motor input shaft of the power generation motor input shaft assembly is connected to the accelerating planetary gear train sun wheel and the clutch hub.

4. The transmission device of the hybrid vehicle according to claim 1, wherein the power generation motor input shaft assembly is detachably connected to the power generation motor.

5. The transmission device of the hybrid vehicle according to claim 1, wherein the driving motor input shaft of the driving motor input shaft assembly is connected to the clutch retainer and the decelerating planetary gear train sun wheel.

6. The transmission device of the hybrid vehicle according to claim 1, wherein the driving motor input shaft assembly is detachably connected to the driving motor.

7. The transmission device of the hybrid vehicle according to claim 1, wherein the output shaft is connected to the decelerating planetary gear train planetary frame.

8. The transmission device of the hybrid vehicle according to claim 1, wherein the connection methods include, but are not limited to, one of welding, riveting, spline fit, interference fit, hinged connection, and integrated machining.

9. The transmission device of the hybrid vehicle according to claim 1, wherein a center line of the output shaft is consistent with an axial direction of the input shaft.

10. The transmission device of the hybrid vehicle according to claim 2, wherein the connection methods include, but are not limited to, one of welding, riveting, spline fit, interference fit, hinged connection, and integrated machining.

11. The transmission device of the hybrid vehicle according to claim 3, wherein the connection methods include, but are not limited to, one of welding, riveting, spline fit, interference fit, hinged connection, and integrated machining.

12. The transmission device of the hybrid vehicle according to claim 5, wherein the connection methods include, but are not limited to, one of welding, riveting, spline fit, interference fit, hinged connection, and integrated machining.

13. The transmission device of the hybrid vehicle according to claim 7, wherein the connection methods include, but are not limited to, one of welding, riveting, spline fit, interference fit, hinged connection, and integrated machining.

* * * * *